United States Patent
Kraibuhler et al.

(10) Patent No.: US 9,889,604 B2
(45) Date of Patent: Feb. 13, 2018

(54) DEVICE FOR THE PRODUCTION OF A THREE-DIMENSIONAL OBJECT

(75) Inventors: Herbert Kraibuhler, Lossburg (DE); Eberhard Duffner, Starzach (DE)

(73) Assignee: ARBURG GMBH + CO. KG, Lossburg (DE)

( * ) Notice: Subject to any disclaimer, the term of this patent is extended or adjusted under 35 U.S.C. 154(b) by 42 days.

(21) Appl. No.: 14/126,608

(22) PCT Filed: Jun. 15, 2012

(86) PCT No.: PCT/EP2012/002520
§ 371 (c)(1),
(2), (4) Date: Dec. 16, 2013

(87) PCT Pub. No.: WO2012/171647
PCT Pub. Date: Dec. 20, 2012

(65) Prior Publication Data
US 2014/0113017 A1   Apr. 24, 2014

(30) Foreign Application Priority Data

Jun. 16, 2011   (DE) .......................... 10 2011 106 615

(51) Int. Cl.
*B29C 67/00* (2017.01)
*B29C 64/112* (2017.01)
(Continued)

(52) U.S. Cl.
CPC ........ *B29C 67/0059* (2013.01); *B29C 64/112* (2017.08); *B29C 64/165* (2017.08); *B29C 64/20* (2017.08)

(58) Field of Classification Search
CPC ............ B29C 67/0059; B29C 67/0081; B29C 67/0085; B29C 64/112; B29C 64/20; B29C 64/165
(Continued)

(56) References Cited

U.S. PATENT DOCUMENTS

| 2002/0113331 A1 | 8/2002 | Zhang et al. |
| 2009/0314391 A1 | 12/2009 | Crump et al. |
| 2010/0193998 A1 | 8/2010 | Crump et al. |

FOREIGN PATENT DOCUMENTS

| DE | 102009030099 A1 | 12/2010 |
| EP | 1886793 A1 | 2/2008 |

OTHER PUBLICATIONS

International Search Report for corresponding application PCT/EP2012002520 filed Jun. 15, 2012; dated Oct. 23, 2012.

*Primary Examiner* — Joseph S Del Sole
*Assistant Examiner* — John P Robitaille
(74) *Attorney, Agent, or Firm* — Cantor Colburn LLP

(57) ABSTRACT

A device for producing a three-dimensional object from hardenable material has a construction space (20) for constructing the object (50), a temperature control unit for controlling the temperature of the construction space (20), and a preparation unit (11) for preparing the hardenable material in such a way that the material is in the fluid phase. A pressure generation unit (10) applies pressure to the fluid phase in the preparation unit. A discharge unit (12) is provided for discharging the hardenable material through an outlet (12b) in the form of drops in the direction of the construction space (20). In order to optimize the energy required to control the temperature that promotes bonding of the material on the object (50), the temperature-controlled construction space (20) is surrounded by a construction space frame (18) in which at least the outlet of the discharge unit (12), the preparation unit (11), and the object support (13) for producing the object are accommodated.

11 Claims, 3 Drawing Sheets

(51) Int. Cl.
*B29C 64/165* (2017.01)
*B29C 64/20* (2017.01)
(58) Field of Classification Search
USPC .......................................................... 425/143
See application file for complete search history.

DEVICE FOR THE PRODUCTION OF A THREE-DIMENSIONAL OBJECT

CROSS REFERENCE TO RELATED APPLICATIONS

The present application claims the priority of German patent application 10 2008 106 615.6 filed on 16 Jun. 2011, the entire contents of which are herein incorporated by reference.

FIELD OF THE INVENTION

The invention relates to a device for the production of a three-dimensional object from hardenable material.

BACKGROUND

In plastic part production, parts are produced by injection molding or extrusion in large batch sizes and series using molds. The advantage of plastic injection molding rests in particular on the highly precise production of complex part geometries, wherein the versatility of operation of the injection molding process covers the requirements for an inexpensive and economical production of plastic parts in an optimal manner.

At the same time, demand for plastic parts in a unit number of one and small batch sizes such as pattern parts, for example, is increasing with the requirement of provision in a very short period as well as properties that are similar to those of injection molded parts. For the production of such parts there are production processes that are widely known by the term prototyping and rapid manufacturing. In most cases, the production of such parts is based on generation of the geometry from 3D data without tools, i.e. without molds. These geometries are produced in a wide variety of forms by appropriate means such as melting powder layers by application of heat, e.g. by means of lasers, generative systems such as printing processes in a different bonding form of the powder parts or also in the so-called melt extrusion process.

An extrusion method for producing objects during prototyping in processing metal based alloys is known from U.S. 2009/0314391 A1. An extrusion method requires low pressures for an continuous object generation, however, in order to keep away the high temperatures required for metallic alloys from the production system, a construction space surround is provided, in which a discharge unit, a processing unit as well as the object support are accommodated. The motor for moving the object support relative to the discharge unit is arranged outside the construction space.

A device, wherein a plasticizing unit known in injection molding technology is coupled to a pressurisable material storage device for generating a fluid phase of a material, is known from the patent EP 1 886 793 A1. To generate an object on an object support in a construction space, this material is discharged in the form of drops through a discharge opening, wherein because of the adhesion force of the material a high pressure and generally also high temperatures must be applied. The construction space can be temperature-controlled, as needed, for which purpose a temperature control unit is provided.

With such a solution, in which highly viscous fluid materials such as molten plastics are to be processed in extremely small quantities in discrete individual portions down to a few micrograms from a material storage device, which is under high pressure and possibly high temperature, temperature conditions quickly occur that influence the temperature control of the construction space.

It is known from DE 10 2009 030 099 A1 to provide in the device known from EP 1 886 793 A1 a construction space, in which the actuator for a solid joint for closing the outlet and also the object support with its movement mechanisms are accommodated, while the heat-generating processing unit remains outside the construction space.

BRIEF SUMMARY

Working from this prior art, the invention achieves an energy-optimized temperature control to assist bonding of the material to the object to be produced.

In order to obtain as favorable an energy utilization as possible and an energy-efficient temperature control, the temperature-controllable construction space is surrounded by a construction space surround, in which at least the outlet of the discharge unit and also the processing unit for the material to be processed are accommodated. Since the processing unit introduces heat by supplying the heated liquid material, an excess of heat generally occurs in the construction space. This is additionally reinforced by the heating during the melting of the material at the processing unit as a result of heat radiation. As a result, the construction space with the object arranged therein and also the drops from the instant they leave the discharge unit are in a temperature range that can be influenced by temperature control. However, the temperature control of the construction space is important or necessary to optimally influence the bonding of the applied drops to the already produced structural part, i.e. the object to be created. Namely, the temperature difference between the melting form of the drop and the surface on the object can be influenced individually thereby. This ability to be influenced is heavily dependent on the material, e.g. in the case of crystalline or amorphous plastics. On the other hand, it is expedient for an energy-optimized consideration to separate the heat flow from the processing unit in the direction of the pressure generating unit in order to also retain the heat generated there where it can be used beneficially. The energy efficiency of the entire system can be increased as a result. This separation is achieved by an insulating element, which is interposed between the processing unit and the pressure generating unit. The construction space surround can be insulated altogether to prevent heat flow to the outside as far as possible.

The electrical drive part of the discharge unit is advantageously located outside the construction space and can therefore be operated at normal ambient temperature under ideal operating conditions matched to the drive. The same also applies in principle to the drive and the drive units of the object support, e.g. a coordinate table. As a result of this, it can be assured, on the one hand, that an optimum temperature prevails in the construction space, while on the other hand this temperature does not have an effect on the precision of the parts, since the mechanical devices and drive mechanisms are located substantially in a cooled region.

This precision of parts can be improved even further by configuring the machine table, which supports above all the processing unit and object support as mutually spaced parts of the device, to be sufficiently rigid that, on the one hand, temperature-related expansions are only noticeable to a small extent, while on the other hand the temperature-controlled construction space also has as little contact with this arrangement as possible with respect to temperature.

BRIEF DESCRIPTION OF THE FIGURES

The invention will be explained in more detail below on the basis of an exemplary embodiment represented in the figures.

DETAILED DESCRIPTION OF PREFERRED EXEMPLARY EMBODIMENTS

Figure 1:
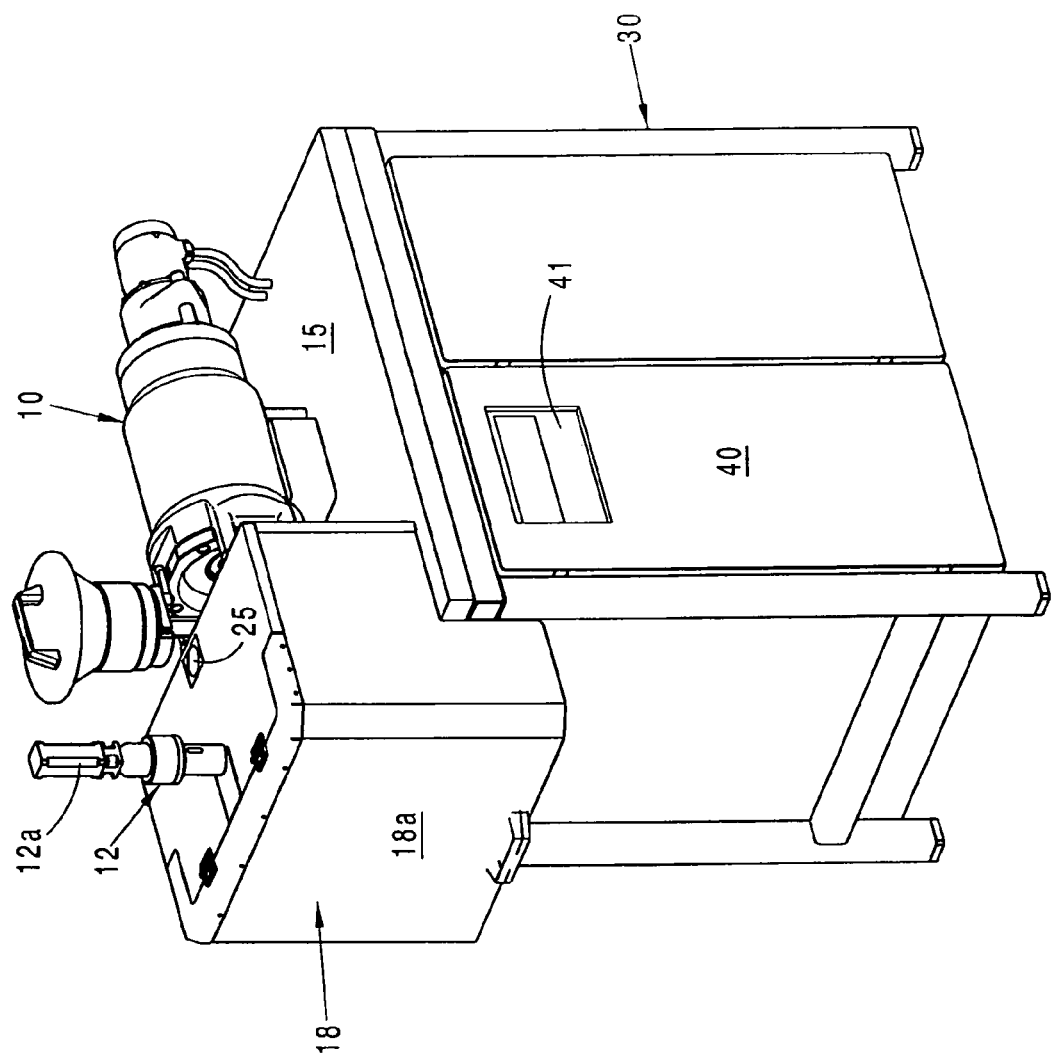
FIG. 1 is a three-dimensional view of the device provided with a construction space surround.

The invention will now be explained in more detail in an exemplary manner with reference to the attached drawings. However, the exemplary embodiments are only examples that are not intended to restrict the inventive concept to a specific arrangement. Before describing the invention in detail, it is pointed out that it is not restricted to the respective structural parts of the device or the respective process steps, since these structural parts and processes can vary. The terms used here are merely intended to describe particular embodiments and are not used for restriction. Moreover, when the singular or indefinite articles are used in the description or in the claims, this also relates to the plural of these elements unless the overall context clearly indicates otherwise.

The Figures show a device for the production of a three-dimensional object 50 or a structural part from hardenable material that is either present in the starting state in a fluid phase or can be liquefied, wherein the production occurs by the sequential discharge of drops 70. This can be achieved, for example, by individual drops 70 being discharged sequentially from an outlet 12b of a discharge unit 12, so that the object 50 is formed layer by layer on an object support 13 in the construction space 20. The hardenable material is a plasticizable material such as e.g. silicon or a plasticizable material such as plastic or also materials in powder form, wherein it is fundamentally important that the hardenable material is either present in the starting state in a fluid phase or can be liquefied. The material can also be a material that is reversibly meltable under heat application and is therefore recyclable. Any other materials can be used so long as these materials are plasticizable by the device and above all are dischargeable through the at least one discharge unit 12.

The hardenable material has a so-called laminar source flow in the fluid phase. The accumulation of the melt at the periphery, inter alia, goes into the source flow. This becomes most clear when looking into the experiences with injection molding. During mold filling of a simple rectangular channel the melt is injected via a so-called gate point and from this point begins to spread in a circular shape with closed flow fronts until it fills the entire width of the cavity. Sometime thereafter the region between the inlet and the flow front can be regarded as nearly formed. At the flow front itself there prevails a particular flow situation, the "source flow", since the flow lines appear like a source in this region when looked at in relation to a coordinate system moving therewith. The melt flows between two rapidly solidified material layers lying close to the cavity surfaces and in the center of the cavity it advances towards the flow front at higher speeds. Shortly before the melt reaches the flow front, its speed component reduces in flow direction and it flows at an angle to the wall until it rests against the wall.

The laminar source flow is advantageous, on the one hand, for the generation of drops 70 'directed' to the construction space 20 because of its laminar configuration, but on the other hand above all with the configuration of small drops it is precisely here that there are also problems that render a conversion with devices and materials known from injection molding more difficult. As a result of the wall adhesion it is difficult for the substances to form into drops with the desired small volume, preferably in the range of smaller than 1 mm$^3$, and at the desired flow speed, while a correspondingly high viscosity of the material is specifically important for the formation of a suitable drop form of a drop.

This also distinguishes the materials used from the previously known waxes. Because of their viscosity, waxes can be output in normal thermal printing or inkjet processes, i.e. by pure kinematic pressureless acceleration without pressure difference of the molten drop. The materials used here already differ therefrom in that their coefficient of viscosity is higher by one or more powers of ten. Thus, the dynamic coefficient of viscosity of the hardenable material lies between 100 and 10000 [Pa s], wherein the hardenable material is preferably a plastic usual in injection molding or a resin. This makes it necessary to conduct processing from a pressurisable material storage device and thus also to use a separate pressure generating unit, since pressures of more than 10 to 100 MPa (100 to 1000 bar) are already necessary, in particular when small outlets are used to obtain small drop volumes.

The desired volume of the drop 70 preferably lies in particular in the range of 0.01 to 0.5 mm$^3$, preferably in the range of 0.05 to 0.3 mm$^3$ and particularly preferred in the range of about 0.1 mm$^3$ The diameter of the outlet 20 is in particular smaller than 1 mm, preferably about 0.1 mm. At a completely usual injection speed of 100 [cm/s], which transports the substance through a so-called gate point with a diameter of 0.1 [mm], a value of 10,000 [m/s] results for the volumetric flow rate. This results in a laminar source flow with flow rates of up to 10,000 m/s for the fluid phase.

The task of the device with its discharge unit is to discharge highly viscous fluid materials such as molten plastics in very small quantities down to few micrograms from a material storage device under high pressure and possibly high temperature. The very small quantities/drops 70 of the material are output by the discharge unit 12 in discrete individual portions, wherein their size can be influenced by the device. The discharged portions have such a high kinetic energy that they can overcome adhesion forces and lift off from the device and float away in the form of drops 70 to form the object 50 in the construction space 20 on the object support 13. In this case, the material is molten and therefore has a viscosity that is higher than the viscosity at the glass transition temperature. There is thus an excess of energy that can be used in an energy-efficient manner for controlling the temperature of the construction space 20.

The pressure generating unit 10 generates the pressure onto the fluid phase prepared in the processing unit 11, wherein the processing unit 11 preferably already forms the material storage device for the material present in the fluid phase. The pressure generating unit is connected to the processing unit 11 and the processing unit is connected to the discharge unit 12, which then itself generates the discontinuous drops 70 by way of the outlet 12b.

The temperature in the construction space 20, which is temperature-controllable in an energy-efficient manner by means of a temperature control unit 25, gains importance under the specified conditions. According to FIGS. 2 and 3 the temperature-controllable construction space 20 is surrounded by a construction space surround 18. This construction space surround 18 surrounds at least the outlet 12b of the discharge unit 12 as well as the processing unit 11 and also the object support 13, on which the object 50 is produced. On the other hand, according to FIGS. 2 and 3 the processing unit 11 and the pressure generating unit 10 are also separated from one another by the construction space surround 18.

As a result, it becomes possible to use as excess heat the feed of the heated liquid plastic or another hardenable material, which is prepared in the processing unit 11 with a supply of heat. According to FIG. 3, this heat supply is additionally assisted by the heating by means of the heating element 22 during the melting of the material as a result of radiation. In the region of the processing unit 11 the material is plasticized and transported by the melt screw or melt worm 26 as far as to the transition region to the discharge unit 12. The construction space 20 has an associated sensor 21 as well as a temperature control unit 25, which as a general rule are positioned in a suitable location by the man skilled in the art, i.e. do not have to be arranged in the location shown in the Figures. The temperature in the construction space 20 can be controlled by this sensor and control system so that an excess heat can be removed in a controlled manner, for example, by fans or heat exchangers. Fans or other auxiliary elements can also be provided as in a forced air oven to assure a uniform heat distribution inside the construction space 20.

Figure 3:
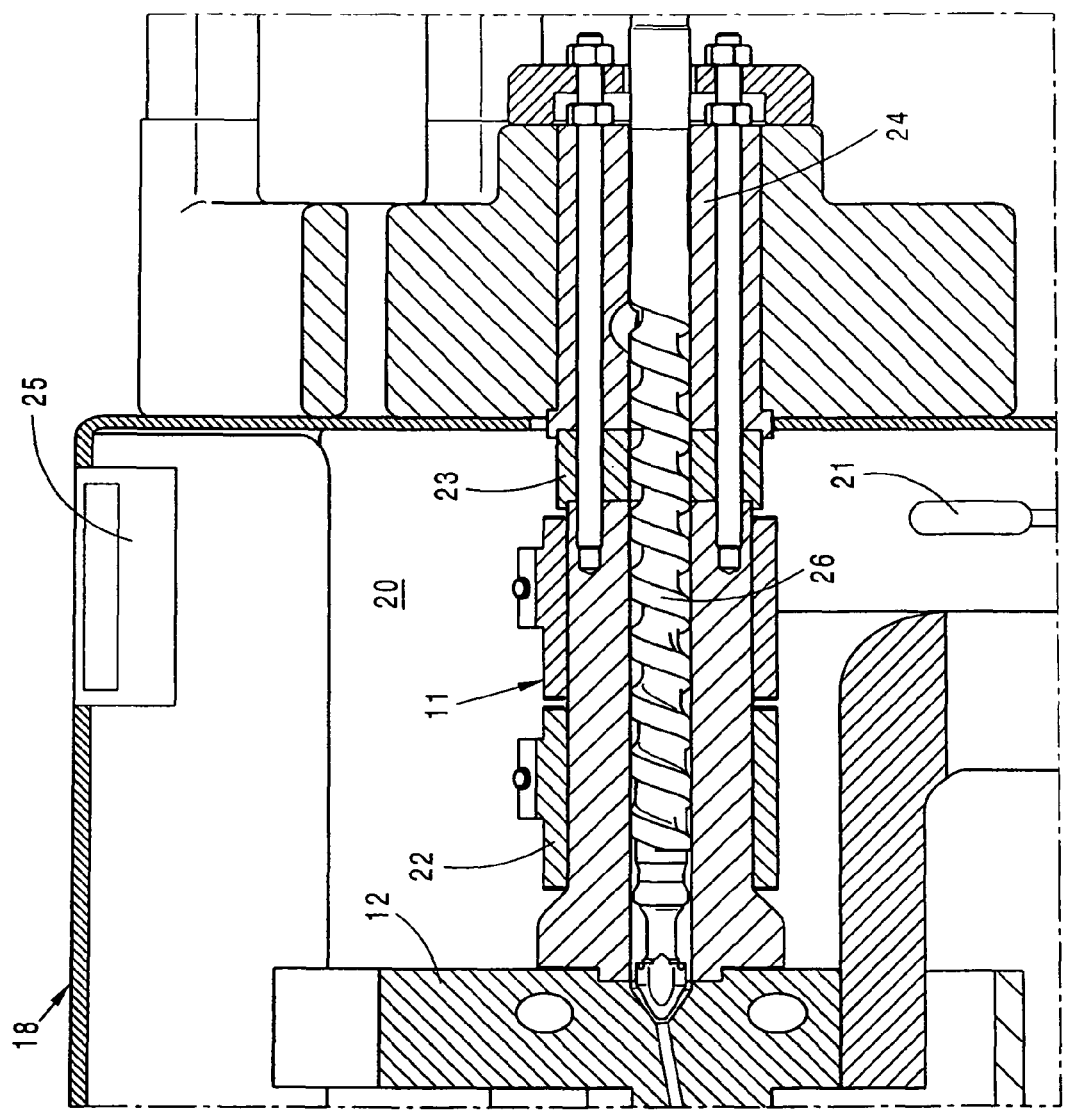
FIG. 3 shows an enlarged section in the region of the transition from the pressure generating unit to the processing unit.

To simultaneously maintain the heat supply at the processing unit 11, the construction space 20 is insulated in relation to the pressure generating unit 10, i.e. on the one hand the construction space surround separates the pressure generating unit 10 thermally from the construction space 20 and the processing unit 11, and on the other hand, according to FIG. 3, an insulating element 23 is arranged there between the pressure generating unit 10 and the processing unit 11 in the wall of the construction space surround 18.

Figure 2:
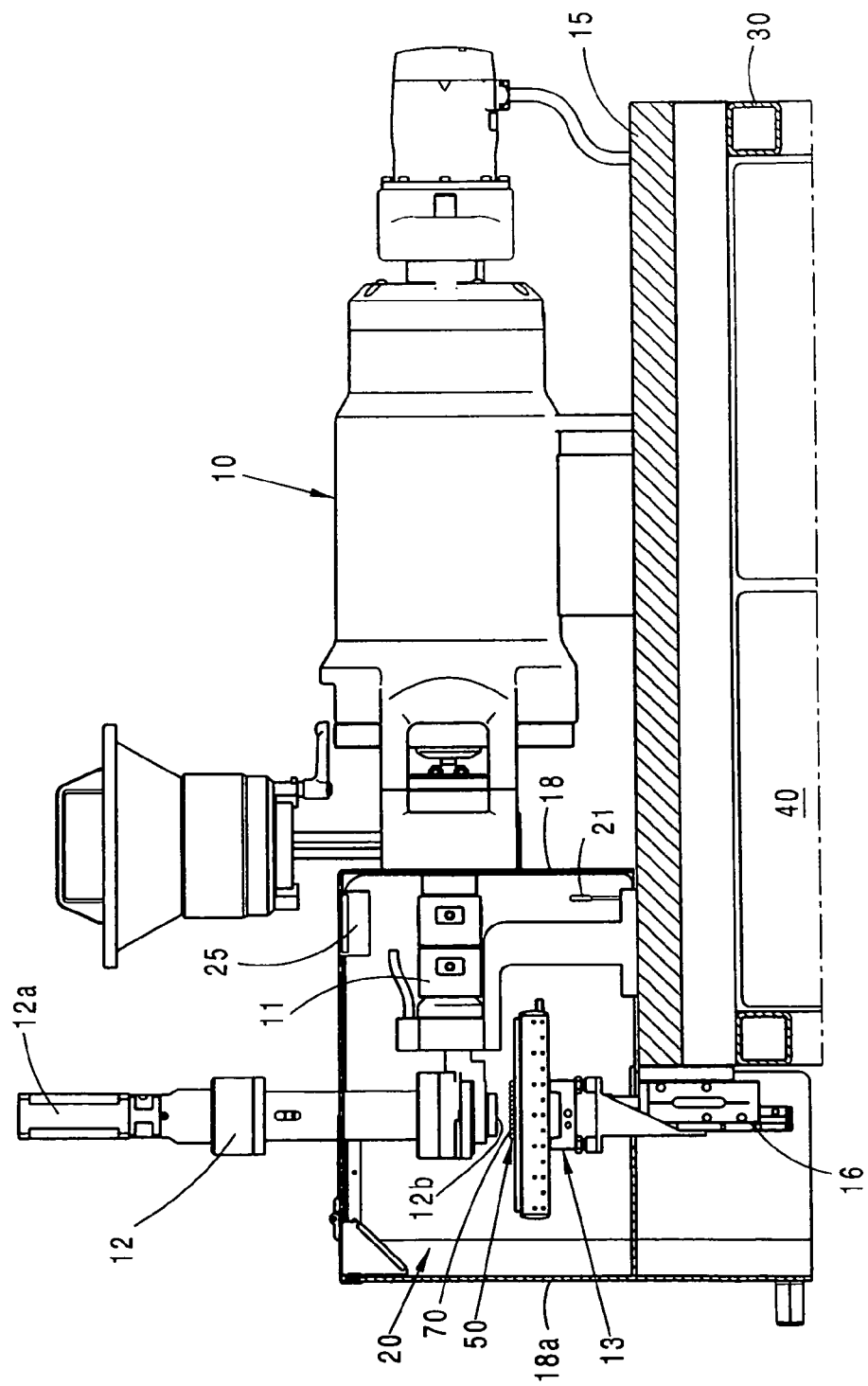
FIG. 2 is a side view of the device represented in partial section.

The construction space surround separates the construction space generally to insulate it overall in relation to its surrounding area according to FIG. 2, so that the heat supply of the processing unit 11 arranged inside the construction space surround 18 controls the temperature of the construction space. However, the processing unit 11 is connected to the discharge unit 12, which on this basis is also to be considered in relation to temperature, since a temperature-related expansion of the processing unit 11 thus also affects the position of the discharge unit 12 and therefore the precision of the parts. The thus created insulation can also be used advantageously to create a protective gas atmosphere in the construction space.

Since the object 50 to be produced is formed on the object support 13 configured, for example, as a coordinate table, the object support 13 is also arranged in the construction space 20. However, this does not apply in the same manner to the corresponding, preferably electrical, drive parts 12a of the discharge unit 12 or to the drive unit 16 of the object support 13. Both elements are arranged outside the construction space surround 18 according to FIG. 2. As a result, these preferably electrical drive parts can be operated under conditions that are not influenced by the temperature desired in the construction space 20. Rather, they are located in normal ambient conditions and thus generally in ideal operating conditions for these parts. It is conceivable here, for example, to arrange the coordinate table above a membrane, through which the articulation of the table passes, but which at the same time allows the drive units and the table the necessary movement clearance. Moreover, if one takes into consideration that the object support 13 is movable spatially relative to the outlet 12b by means of the drive unit 16, which should also be as precise as possible, it is advantageous if the drive unit 16 is also arranged outside the construction space surround 18, since the coordinates for the object support 13 can then also be selected more precisely. Moreover, as a general rule a standard temperature compensation can occur by means of software with the aid of suitable sensor technology in order to convert a desired-actual position reference.

It is thus important, on the one hand, that the necessary temperature control energy for the temperature control of the construction space is used from the process, i.e. preferably from the material processing, by using an energy-optimized temperature control regulated by energy accumulation or energy dissipation to assist the production of the object 50 by connecting drops. Moreover, a complete temperature control of the construction space is easier to achieve than an energy supply at a specific point, e.g. at the connection point between the object 50 already produced and the newly added drop 70.

The precision of the parts can be further assisted by the device according to FIG. 2 being arranged on a machine frame 30, in which the machine control system 40 and the operating unit 41 are also arranged, and on which a machine table 15 is arranged, on which the object support 13 for forming the object 50 and also the processing unit 11 are mounted in a geometrically fixed relation to one another. This machine table is preferably a plate arranged outside the construction space surround 18 according to FIG. 2, which is so fixed with respect to the temperature difference between the construction area 20 and the surrounding area that the precision of the object 50 to be produced remains unaffected. According to FIG. 1 the construction space surround 18 has a closable opening 18a, through which the construction space is accessible. The processing unit 11 and pressure generating unit 10 are formed by a plasticizing unit known in injection molding technology for processing the hardenable material as plasticized or plasticizable material. Thus, a material that is customarily obtainable or exists in injection molding can be used to produce the parts. A separate special material is therefore not necessary.

It is clearly understood that this description can be subject to a wide variety of modifications, changes and adaptations that come within the sphere of equivalents to the attached claims.

The invention claimed is:

1. Device for the production of a three-dimensional object from hardenable material that is either present in the starting state in a fluid phase or can be liquefied, by a sequential discharge of drops with at least one construction space for forming the object on an object support, the construction space defined within a construction space surround, a temperature control unit for controlling the temperature of the construction space, at least one processing unit, located within the construction space, for processing the hardenable material to the fluid phase, the at least one processing unit including a heating element, at least one pressure generating unit for generating pressure onto the fluid phase processed in the at least one processing unit, the at least one pressure generating unit separated from the construction space by the construction space surround, at least one discharge unit for discharging the hardenable material as drops through an outlet in a direction of the construction space, wherein the construction space is temperature-controllable, wherein at least the outlet of the at least one discharge unit and the at least one processing unit as well as the object support are accommodated within the construction space surround, wherein the at least one processing unit, and the heating element thereof, are preparing the fluid phase with a supply of heat and are arranged inside the construction space surround, and wherein the at least one processing unit includes a melt screw, further comprising an insulating element interposed between the at least one processing unit and the at least one pressure generating unit and separates the at least one processing unit from the at least one pressure generating unit, the insulating element disposed in a wall of the construction space surround and adapted to keep the supply of heat inside the construction space surround.

2. Device according to claim 1, wherein the construction space surround surrounds the construction space to insulate it from its surrounding area, so that the supply of heat of the at least one processing unit controls the temperature of the construction space.

3. Device according to claim 1, wherein the object support is provided for forming the object, which is movable relative to the outlet by means of at least one drive unit, wherein the at least one drive unit is arranged outside the construction space surround.

4. Device according to claim 1, wherein it has a machine table, on which the object support for forming the object and also the at least one processing unit are mounted in a geometrically fixed relation to one another.

5. Device according to claim 1, wherein the at least one processing unit and the at least one pressure generating unit comprising the melt screw are formed by a plasticising unit known from injection moulding technology for processing the hardenable material as plasticised or plasticisable material.

6. Device according to claim 1, wherein the melt screw extends through the insulating element.

7. Device for the production of a three-dimensional object from hardenable material that is either present in the starting state in a fluid phase or can be liquefied, by a sequential discharge of drops with at least one construction space for forming the object on an object support, the construction space defined within a construction space surround, a temperature control unit for controlling the temperature of the construction space, at least one processing unit, located within the construction space, for processing the hardenable material to the fluid phase, the at least one processing unit including a heating element, at least one pressure generating unit for generating pressure onto the fluid phase processed in the at least one processing unit, the at least one pressure generating unit separated from the construction space by the construction space surround, at least one discharge unit for discharging the hardenable material as drops through an outlet in a direction of the construction space, wherein the construction space is temperature-controllable, wherein at least the outlet of the at least one discharge unit and the at least one processing unit as well as the object support are accommodated within the construction space surround, wherein the at least one processing unit, and the heating element thereof, preparing the fluid phase with a supply of heat is arranged inside the construction space surround, further comprising an insulating element interposed between the at least one processing unit and the at least one pressure generating unit that physically and thermally separates the at least one processing unit from the at least one pressure generating unit, the insulating element disposed in a wall of the construction space surround transversely to the at least one pressure generating element and adapted to keep the supply of heat inside the construction space surround.

8. Device according to claim 7, wherein the construction space surround surrounds the construction space to insulate it from its surrounding area, so that the supply of heat of the at least one processing unit controls the temperature of the construction space.

9. Device according to claim 7, wherein the object support is provided for forming the object, which is movable relative to the outlet by means of at least one drive unit, wherein the at least one drive unit is arranged outside the construction space surround.

10. Device according to claim 7, wherein the at least one processing unit and the at least one pressure generating unit comprising a melt screw are formed by a plasticising unit known from injection moulding technology for processing the hardenable material as plasticised or plasticisable material.

11. Device according to claim 7, wherein the at least one processing unit comprises a melt screw extending through the insulating element.

* * * * *